United States Patent [19]

Kaido et al.

[11] Patent Number: 4,824,897

[45] Date of Patent: Apr. 25, 1989

[54] RUBBER COMPOSITIONS FOR STEEL TIRES

[75] Inventors: Hiroyuki Kaido, Hadano; Yasuhiro Ishikawa, Hiratsuka, both of Japan

[73] Assignee: The Yokohama Rubber Co., Ltd., Tokyo, Japan

[21] Appl. No.: 220,964

[22] Filed: Jun. 16, 1988

Related U.S. Application Data

[63] Continuation of Ser. No. 67,123, Jun. 29, 1987, abandoned.

[30] Foreign Application Priority Data

Jul. 11, 1986 [JP] Japan ................. 61-161995

[51] Int. Cl.$^4$ .................. C08K 3/04; C08K 5/05; C08K 5/09
[52] U.S. Cl. .................. 524/385; 524/398; 524/495; 524/526
[58] Field of Search ............. 524/385, 398, 495, 526

[56] References Cited

U.S. PATENT DOCUMENTS

| | | | |
|---|---|---|---|
| 3,925,246 | 12/1975 | Coates et al. | 524/302 |
| 3,944,630 | 3/1976 | Ide et al. | 525/221 |
| 4,010,128 | 3/1977 | Saggose et al. | 524/385 |
| 4,157,320 | 6/1979 | Yanker | 524/377 |
| 4,173,552 | 11/1979 | Kuceski et al. | 524/296 |
| 4,182,702 | 1/1980 | Swartz | 524/925 |
| 4,315,081 | 2/1982 | Kobayashi et al. | 524/145 |
| 4,323,534 | 4/1982 | DesMarais | 524/385 |

FOREIGN PATENT DOCUMENTS

| | | | |
|---|---|---|---|
| 0031804 | 9/1971 | Japan | 524/385 |
| 0084352 | 6/1980 | Japan | 524/385 |
| 6155235 | 12/1981 | Japan | 524/385 |
| 1264033 | 11/1986 | Japan | 524/385 |
| 351356 | 6/1931 | United Kingdom | 524/385 |
| 999606 | 7/1965 | United Kingdom | 524/385 |

OTHER PUBLICATIONS

"Polymer Friends", p. 612 (Oct., 1983).

*Primary Examiner*—Herbert J. Lilling
*Attorney, Agent, or Firm*—Finnegan, Henderson, Farabow, Garrett & Dunner

[57] ABSTRACT

Rubber compositions are disclosed which are highly calenderable and adhesively strong for coating on steel cords to be assembled in radial tires. Such coating characteristics are obtained by the use of specified amounts of a selected type of saturated aliphatic alcohol combined with selected base rubbers.

6 Claims, No Drawings

RUBBER COMPOSITIONS FOR STEEL TIRES

This application is a continuation of application Ser. No. 067,123, filed June 29, 1987, now abandoned.

BACKGROUND OF THE INVENTION

1. Field of the Invention

This invention relates to rubber compositions suitable for coating on steel cords for steel tires.

2. Prior Art

Steel-layered belts, carcasses and chafers, commonly used for radial tires, are generally known as composite structures made up of steel cords and rubbers. In "Polymer Friends", p. 612 (October, 1983), it is proposed to apply by calender coating an unvulcanized rubber sheet of about 0.6 mm thick to both surfaces of a steel cord at a temperature of 80°-120° C. This method however has a drawback in that unvulcanized rubber material adheres to the calender roll and hence becomes difficult to process.

Generally, the extent to which an unvulcanized rubber sheet sticks to the calender roll varies with the difference between the green tack of the rubber to the roll surface and the green strength tending to strip the rubber therefrom. Thin sheets of unvulcanized rubber therefore when exposed at elevated working temperature are literally too sticky to be effectively coated. This is particularly true of rubber compositions in which natural rubber is blended with cobalt naphthenate and phenolic resin so as to attain strong rubber-to-steel adhesion. Such known compositions are susceptible to decline in green strength during calendering because the additives make unvulcanized rubber highly tacky and also because the presence of cobalt ions accelerates the degradation of the rubber.

To cope with this problem, there have been employed tack reducers such as waxes and fatty acids and their esters and metallic salts. Waxes and fatty acid esters are effective for tack reduction at room temperature but not at high temperature. Metallic salts of fatty acids are good at high temperature but cause fast blooming at room temperature which is undesirable for the resulting composite structure to be laminated into a green tire. Fatty acids typified by stearic acid are highly effective for tack reduction at elevated temperature, but to an extent reduce adhesion with steel cords.

SUMMARY OF THE INVENTION

It has now been found that rubber compositions of superior calendering and physical characteristics can be obtained by the addition of a selected type of saturated aliphatic alcohol.

The rubber compositions contemplated by the invention are suitable for use particularly in the formation of rubber-coated steel cords such as belts, carcasses and chafers for radial tires.

It is therefore the primary object of the invention to provide rubber compositions for use in steel tires which are highly capable of calender rolling and strong adhesion to steel cords.

This and other objects and features of the invention will be better understood from the following detailed description.

The rubber composition of the invention essentially comprises 0.25-1 parts by weight of a saturated aliphatic monovalent alcohol having a carbon number of 14-20, based on 100 parts by weight of a vulcanizable starting rubber.

DETAILED DESCRIPTION OF THE INVENTION

Starting rubbers eligible for the purpose of the present invention include for example natural rubber and polyisoprene which may be blended with styrene-butadiene rubber, polybutadiene rubber and the like.

The amount of the natural rubber or polyisoprene rubber to be added should be more than 50 parts by weight of the total starting rubber.

Alcohols according to the invention are saturated monovalent alcohols of an aliphatic class having a carbon number of 14-20. Specific examples include myristyl alcohol, cetyl alcohol, stearyl alcohol, eicosyl alcohol and the like. Particularly preferred is what is called industrial stearyl alcohol predominantly of solid stearyl alcohol for its relatively low melting point.

The amount of the alcohol to be added should be in the range of 0.25-1.0 parts, preferably 0.50-1.0 parts, per 100 parts by weight of the starting rubber. Smaller amounts would fail to give reduced tack, while larger amounts would invite vigorous blooming at room temperature.

There is no particular restriction imposed on the use of other blends. It is convenient to blend a starting rubber for instance of more than 80 parts by weight of natural rubber or polyisoprene rubber with HAF carbon black, sulfur and a cobalt salt of an organic carboxylic acid in amounts of 50-70 parts, 2.5-8 parts and 1-3 parts by weight, respectively, per 100 parts by weight of the starting rubber, and further with zinc oxide, an antioxidant, a vulcanization accelerator, a softener and the like. Stearic acid useful as a vulcanizing activator may be added in small amounts of less than 0.5 part by weight. Larger amounts should be avoided to preclude a decline in the adhesion quality of the resulting composition.

The present invention will now be further described by way of the following examples which should not be regarded as limiting the invention.

EXAMPLES 1-4 AND COMPARATIVE EXAMPLES 1-5

Different rubber compositions were formulated as per tabulated and prepared by admixing the components other than insoluble sulfur and vulcanization accelerator in a closed mixer, followed by addition of the remaining components through an open roll.

All of the compositions were tested for processability and adhesion under the conditions given below and with the results tabulated.

Processability at Room Temperature

This quality was adjusted acceptable if two superposed rubber sheets formed from each test composition stick together with light finger pressure by tackiness inherent in unvulcanized rubber and can be separated if necessary for adjustment.

Processability at Elevated Temperature

This was determined by the length of time required for rolling in which each test composition was passed at 80° C. through and wound on a pair of 8-inch rolls to a thickness of 1 mm.

Acceptable processability was assessed by the length of time for the sheet to take before it loses flatness, or sticks to the roll and becomes hard to cut. The prior art rubber compositions are susceptible to plasticization during high temperature rolling, resulting in reduced green strength and increased green tack.

control, Comparative Example 3, resulted in reduced length of roll workable time as the wax became dissolved in the base rubber and hence failed to bloom out of the rubber surface.

TABLE

| Runs | Comparative Examples | | | Examples | | | | Comparative Example 4 | Comparative Example 5 |
|---|---|---|---|---|---|---|---|---|---|
| | 1 | 2 | 3 | 1 | 2 | 3 | 4 | | |
| Formulations (part by weight) | | | | | | | | | |
| natural rubber (RSS, No. 1) | 100 | 100 | 100 | 100 | 100 | 100 | 100 | 100 | 100 |
| carbon black | 60 | 60 | 60 | 60 | 60 | 60 | 60 | 60 | 60 |
| zinc oxide | 10 | 10 | 10 | 10 | 10 | 10 | 10 | 10 | 10 |
| phenol-formaldehyde resin | 3 | 3 | 3 | 3 | 3 | 3 | 3 | 3 | 3 |
| antioxidant (6C) | 1 | 1 | 1 | 1 | 1 | 1 | 1 | 1 | 1 |
| cobalt naphthenate (Co, 10%) | 2.5 | 2.5 | 2.5 | 2.5 | 2.5 | 2.5 | 2.5 | 2.5 | 2.5 |
| insoluble sulfur (oil, 20%) | 8 | 8 | 8 | 8 | 8 | 8 | 8 | 8 | 8 |
| vulcanization accelerator (DCBS) | 0.5 | 0.5 | 0.5 | 0.5 | 0.5 | 0.5 | 0.5 | 0.5 | 0.5 |
| stearic acid (1) | — | 1 | — | — | — | — | — | — | — |
| microcrystalline wax (2) | — | — | 0.5 | — | — | — | — | — | — |
| myristyl alcohol (3) | — | — | — | 1 | — | — | — | — | — |
| stearyl alcohol (4) | — | — | — | — | 0.25 | 0.5 | 1 | 2 | 4 |
| Test Results | | | | | | | | | |
| Processability | | | | | | | | | |
| room temperature green tack | slightly too much | acceptable | acceptable | acceptable | acceptable | acceptable | acceptable | slightly too less | too less |
| roll workable time (sec) (index) | 120(100) | 180(150) | 115(96) | 170(142) | 150(125) | 170(142) | 175(146) | over 300 (<250) | over 300 (<250) |
| Adhesion | | | | | | | | | |
| pull-out strength, original (kg/0.5 in) | 58 | 63 | 60 | 62 | 62 | 59 | 61 | 60 | 55 |
| rubber coverage, original (%) | 95 | 95 | 95 | 95 | 95 | 95 | 95 | 95 | 93 |
| pull-out strength, aged (kg/0.5 in) | 44 | 35 | 45 | 44 | 45 | 44 | 45 | 43 | 35 |
| rubber coverage, aged (%) | 85 | 70 | 85 | 85 | 85 | 85 | 85 | 80 | 66 |

(1) Lunac S-40, Kao Corp.
(2) Suntight R, Seiko Chemical Co.
(3) Kalcol 40, Kao Corp.
(4) Kalcol 80, Kao Corp.

Adhesion

ASTM D2229 was followed in which after being vulcanized at 160° C. for 30 minutes, each test composition was calender-coated on to a steel cord formed of 5-stranded, brass-plated wires each 0.25 mm in diameter. Adhesion was adjudged by the pull-out strength of wires and subsequent rubber coverage. Tests were made using two vulcanizates, one being original and the other hot water-aged. The original sample was derived from disposition at room temperature for 24 hours after vulcanization. The aged sample was obtained by dipping in distilled water at 70° C. for 3 hours, followed by standing at room temperature for 6 hours.

The pull-out strength is by kg per wire. The rubber coverage is graded at 100% when the rubber remains on the overall cord surfaces even after wire pull-out and as 0% when the rubber is fully released.

As appears clear from the tabulated data, Examples 1–4 representing the invention are highly satisfactory in respect of all the performance characteristics tested. The longer the length of roll workable time is the larger is the amount of stearyl alcohol. The alcohol beyond the above specified range has been found to cause blooming at room temperature, hence reduced adhesion, as evidenced by Comparative Examples 4 and 5.

Comparative Example 1 devoid of a tack reducer, though acceptable in adhesion, showed a limited length of roll workable time of 120 seconds which was taken as the index of comparison. The use of stearic acid failed to improve ahesion after aging as is apparent from Comparative Example 2. A microcrystalline wax containing

What is claimed is:

1. A rubber composition for coating the steel cords of automobile tires comprising:
    (a) 100 parts of a vulcanizable starting rubber containing more than 50 parts by weight of a first rubber selected from the group consisting of natural rubber and polyisoprene rubber and combinations thereof; and
    (b) from 0.25 to 1.0 parts by weight of a saturated aliphatic monovalent alcohol having from 14 to 20 carbon atoms;
    (c) from 50 to 70 parts by weight of carbon black;
    (d) from to 2.5 to 8 parts by weight of sulfur; and
    (e) from 1 to 3 parts by weight of cobalt salt of an organic carboxylic acid.

2. The rubber composition of claim 1 wherein said alcohol is selected from the group consisting of myristyl alcohol, cetyl alcohol, stearyl alcohol and eicosyl alcohol.

3. The rubber composition of claim 1 wherein said starting rubber is a blend of said first rubber, styrene-butadiene rubber and polybutadiene rubber.

4. The rubber composition of claim 1, wherein the alcohol is present in an amount of from 0.5 to 1.0 parts per 100 parts by weight of the starting rubber.

5. The rubber composition of claim 1, wherein the starting rubber contains more than 80 parts by weight of said first rubber.

6. The rubber composition of claim 1, wherein the cobalt salt is cobalt naphthenate.

* * * * *